United States Patent [19]

Kunishige et al.

[11] Patent Number: 4,750,963

[45] Date of Patent: Jun. 14, 1988

[54] METHOD FOR PRODUCING LAMINATED PRODUCT OF POROUS MATERIALS

[75] Inventors: Tadao Kunishige, Kusatsu; Masaru Sugimori; Yoshiharu Kuramoto, both of Takatsuki, all of Japan

[73] Assignee: Sunstar Giken Kabushiki Kaisha, Takatsuki, Japan

[21] Appl. No.: 876,175

[22] Filed: Jun. 19, 1986

[51] Int. Cl.$^4$ .................................................. C09J 5/02
[52] U.S. Cl. ............................. 156/307.3; 156/331.4; 427/426; 524/500; 524/539; 524/591; 525/458
[58] Field of Search ................... 427/426; 525/458; 524/500, 539, 591; 156/307.3, 331.4

[56] References Cited

U.S. PATENT DOCUMENTS 4,476,276 10/1984 Gasper .............................. 524/500
4,479,840 10/1984 Takegawa et al. ............... 427/426

FOREIGN PATENT DOCUMENTS 58-52378 3/1983 Japan .

*Primary Examiner*—John J. Gallagher
*Attorney, Agent, or Firm*—Wegner & Bretschneider

[57] ABSTRACT

An improved method for the production of a laminated product of porous materials, which comprises applying a two-part aqueous adhesive comprising (A) a main composition comprising a water-soluble urethane prepolymer and a polyurethane rubber, and (B) a curing composition comprising water and optionally a conventional curing agent, to the surface of at least one of materials to be adhered, wherein at least one of the materials to be adhered is a porous material, and piling up the materials and then pressing. Said two-part aqueous adhesive has excellent adhesion, particularly initial adhesion, and hence can give the desired laminated products by pressing the piled materials for a very short period of time, and the laminated products have excellent feeling and handling and are useful as a material for seats in automobiles, offices, etc., carpets, cushions, and the like.

5 Claims, No Drawings

METHOD FOR PRODUCING LAMINATED PRODUCT OF POROUS MATERIALS

This invention relates to a method for producing a laminated product of porous materials, more particularly, to a method for producing a laminated product of materials, at least one of which is a porous material, by applying a specific two-part adhesive to the surface of at least one of materials to be adhered, piling up the materials, and then pressing them to effect the adhesion.

PRIOR ART

For producing laminated products of two or more porous materials such as woods, slates, papers, clothes, felts and plastic foams or of the porous materials with other non-porous materials such as metallic or plastic sheets, etc. there have been used various adhesives. Particularly, in view of safety and improved hygienics, i.e. prevention of environmental pollution, as well as saving resources, saving energy and making the apparatus compact, it has recently been proposed to use an aqueous adhesive instead of thermosetting adhesives, two-part reactive adhesives, hot melt type adhesives of thermoplastic resins and organic solvent type adhesives. However, such an aqueous adhesive is not satisfactory because of the lower speed in curing time and less guarantee of quality of products.

The present inventors had proposed an improved method for producing laminated products of porous materials by applying a two-part aqueous adhesive which comprises a main composition containing a water-soluble urethane prepolymer as a main ingredient and a curing composition containing water and other conventional curing agent (cf. Japanese Patent First Publication No. 52378/1983). However, as a result of the present inventors' further intensive study, it has been found that the two-part aqeuous adhesive has still a drawback that it is less in adhesion, particularly in the initial adhesion.

SUMMARY BRIEF OF THE INVENTION

The present inventors have further intensively studied on an improved method for producting laminated products of porous materials and have now found that when a polyurethane rubber is incorporated into the main composition in the above-mentioned two-part aqueous adhesive, the adhesion, particularly initial adhesion, is significantly improved to give the desired adhesive suitable for laminating porous materials.

An object of the invention is to provide an improved method for producing laminated products of porous materials. Another object of the invention is to provide an improved two-part aqueous adhesive which is suitable for producing laminated products of porous materials. A further object of the invention is to provide a method for producing laminated products of porous materials by applying an improved two-part aqueous adhesive to the surface of at least one of materials to be adhered, piling up said materials, and pressing the materials. These and other objects and advantages of the invention will be apparent to those skilled in the art from the following description.

DETAILED DESCRIPTION OF THE INVENTION

The two-part aqueous adhesive used in the invention comprises (A) a main composition comprising a water-soluble urethane prepolymer and a polyurethane rubber, and (B) a curing composition comprising water and optionally conventional curing agents.

The water-soluble urethane prepolymer is prepared by reacting a polyalkylene ether polyol and an excess amount of a polyisocyanate. Such a polyalkylene ether polyol is usually obtained by adding an ethylene oxide to a compound containing two or more active hydrogens in a molar ratio of 30 to 90%, in other words, the polyalkylene ether polyol has preferably an ethylene oxide content of 30 to 90% by mole. Suitable examples of the compound containing two or more active hydrogens are ethylene glycol, diethylene glycol, propylene glycol, dipropylene glycol, glycerin, trimethylolpropane, pentaerythritol, sorbitol, sucrose, and the like. The two or more active hydrogens-containing compound is subjected to addition or co-addition reaction with ethylene oxide or other alkylene oxides (e.g. propylene oxide, butylene oxide, etc.). The polyalkylene ether polyol has preferably a molecular weight of 1,000 to 20,000, particularly 1,000 to 5,000 in view of the good hydrophilic property and good workability. Polyalkylene ether diols are particularly preferable.

The polyisocyanate to be reacted with the polyalkylene ether polyol includes any conventional compounds which are usually used for the preparation of urethane prepolymers, for example, toluene diisocyanate, diphenylmethane-4,4'-diisocyanate, etc. which may be purified product or crude product. In view of less odor, good workability, good curing property, good adhesion and less toxicity, diphenylmethane-4,4'-diisocyanate is particularly preferable. The polyalkylene ether polyol and the polyisocyanate are used in a ratio of NCO/OH =3.0 to 6.0 equivalents. The urethane prepolymer has preferably a residual active isocyanate group of 4 to 13% by weight and a viscosity of 3,000 to 10,000 cps (at 20° C.) in view of excellent reactivity, workability and performance.

The polyurethane rubber to be incorporated into the main composition includes conventional polyurethane rubbers which are elastomers containing a urethane bond in the molecule and are usually prepared by polycondensing a polybasic acid (e.g. terephthalic acid, isophthalic acid, phthalic acid, succinic acid, adipic acid, azelaic acid, sebacic acid, etc.) and a divalent alcohol (e.g. ethylene glycol, 1,4-butanediol, 1,5-pentanediol, 1,6-hexanediol, diethylene glycol, triethylene glycol, polyethylene glycol, propylene glycol, etc.) to give saturated polyester resin having a hydroxy group at both termini, and then reacting the resulting polycondensation product with a diisocyanate compound (e.g. tolylene diisocyanate, diphenylmethane diisocyanate, hexamethylene diisocyanate, xylylene diisocyanate, cyclohexylmethane diisocyanate, etc.), whereby the active hydrogen group in the polycondensation product being reacted with an amount of a little bit less than equimolar amount of isocyanate group to give a linear high molecular compound. The polyurethane rubber has preferably a high cyrstallinity, a viscosity of 0.6 to 1.2 Pa.s in 15% methyl ethyl ketone solution (at 23° C.), a 100% modulus of 50 to 80 kg/cm$^2$, and a molecular weight of 30,000 to 40,000. Such a polyurethane rubber is commercially available, for example, Desmocal 400, Desmocol 420, Desmocol 500, Desmocol 510 and Desmocol 530 (manufactured by Bayer AG). The polyurethane rubber is incorporated in an amount of 0.5 to less than 10% by weight, preferably 0.5 to 5% by weight, more preferably 0.7 to 3% by weight, based on the whole weight of the main composition (A). When the polyurethane rubber is used in an amount of not less than 10% by weight, the composition has too high viscosity and hence is hardly applicable to the materials to be adhered, particularly when it is applied to by spraying. On the other hand, when the amount is less then 0.5% by weight, the desired effect for improving the initial adhesion of the adhesive can hardly be obtained.

The main composition has preferably a viscosity of 500 to 5,000 cps (at 20° C.), more preferably 700 to 3,500 cps (at 20° C.).

The curing composition (B) comprises water as the main ingredient which has an active hydrogen reactive with the active isocyanate of the urethane prepolymer. The curing composition may contain also various reactive catalysts, such as organic amines (e.g. triethylenediamine, triethylamine, dimethylethanolamine, tetramethylpropylenediamine, tetramethylenetriamine, etc.), inorganic basic compounds, (e.g. borax, sodium hydroxide, etc.), urea, thiourea, amino acid salts (e.g. monosodium L-aspartate monohydrate, L-lysine acetate, etc.), basic amino acids (e.g. L-arginine, L-histidine, etc.), and the like. Among these catalysts, in view of less toxicity, less odor, water-solubility and economy, inorganic basic compounds, urea, thiourea, amino acid salts, basic amino acids and mixture thereof are particularly preferable. The catalyst is usually incorporated in an amount of 1 to 40% by weight, preferably 4 to 25% by weight, based on the whole weight of the curing composition. The curing composition is preferably in the form of an aqueous solution or suspension which can be sprayed.

The main composition (A) may optionally contain other conventional additives, such as fillers, antioxidants, coloring agents, reaction catalysts, adhesion improvers, solvents, plasticizers, etc. Besides, the curing composition may also optionally contain other additives, such as adhesion improvers, coloring agents, fillers, water-soluble resins, and surfactants.

The surfactants are effective for improving compatibility between the main composition and the curing composition. The coloring agents are useful for confirming the mixing state of the main composition and the curing composition and also the application amount. Besides, the filling agents and water-soluble resins are effective for preventing penetration of the compositions into the porous materials and also saving the cost.

The production of the laminated product of porous materials can be carried out in the following manner.

Firstly, the main composition (A) and the curing composition (B) are applied to the surface of at least one of the materials to be adhered, either one or both of the materials to be adhered being porous material. When the compositions (A) and (B) are applied, both may previously be mixed or may be separately applied, but preferably, both compositions (A) and (B) are simultaneously sprayed so as to contact and be admixed each other just before being applied to the surface of the materials. The main composition (A) and the curing composition (B) are usually used in a ratio of 100:10 to 100:200 by weight (A:B), preferably 100:20 to 100:100 by weight. The main composition (A) is usually applied to in an amount of 45 to 200 g/m$^2$, preferably 60 to 120 g/m$^2$, and the curing composition (B) is usually applied to in an amount of 5 to 300 g/m$^2$, preferably 20 to 100 g/m$^2$. That is, the application amount of the compositions (A) and (B) is usually in a range of 50 to 400 g/m$^2$, preferably 80 to 200 g/m$^2$, in total. When the application amount in total is over the above range, the resulting laminated products show inferior feeling and handling, and on the other hand, when the application amount is less than the above range, the two-part aqueous adhesive shows inferior adhesion. Particularly, when the application amount of the curing composition (B) is less than the above range, the curing speed is lowered, and hence requires much longer period of time in the piling and pressing steps.

After application of the two-part aqueous adhesive, the materials to be adhered are piled on each other, and then are pressed. The pressing is usually carried out by hot pressing with a conventional pressing machine under a pressure of 0.02 to 0.5 kg/cm$^2$, preferably 0.03 to 0.2 kg/cm$^2$, at an elevated temperature (e.g. 50 to 120° C.) for a short period of time, for example, for 10 to 60 seconds. According to the method of this invention, the laminated products can be obtained by a very short pressing period because of the excellent initial adhesion force of the main composition (A) used in this invention.

The method of this invention can be applied to lamination of various porous materials, such as wooden materials, slates, papers, clothes, felts, plastic foams, and also lamination of the porous materials with non-porous materials, such as metallic sheets and plastic sheets. The laminated products of porous materials of this invention show excellent peel resistance and can be used for various utilities, such as seats for automobiles, offices, etc., carpets, cushions, and the like.

The invention is illustrated by the following Preparations, Examples and Tests, but should not be construed to be limited thereto. In Examples and Tests, the peel strength of the laminated products was measured in the following manner.

A test piece of a laminated product (width: 25 mm) was subjected to a peel test under the condition of atmosphere of 20° C. and 65% relative humidity, at an angle of 180° at a crosshead speed of 50 mm with Autograph IM-500, and thereby the peel strength (kg/in) was measured. Besides, the state of break (initial adhesion) was observed whether it showed material break or was broken at interface thereof, by peeling the laminated product by hand immediately (usually 10 to 15 seconds) after the hot pressing.

PREPARATION 1

Preparation of the main composition (A):

A polyalkylene ether diol (average molecular weight: 3,000) (Adeka Polyether PR3007 ®, manufactured by Asahi Denka Kogyo K. K., Japan, ethylene oxide content: 70% by mole) (200 parts by weight) and diphenylmethane-4,4'-diisocyanate (NCO/OH ratio=6.0, 100 parts by weight) are charged in a vessel provided with a jacket for heating, and the mixture is reacted at 80°-90° C. for 3 hours to give a water-soluble urethane prepolymer having a residual active isocyanate group of 9.33% by weight and a viscosity of 4,000 cps (at 20° C.).

To the urethane prepolymer thus prepared (300 parts by weight) is added methylene chloride (25 parts by weight), and the mixture is uniformly mixed, and then, thereto is added a previously prepared a 20% solution of a polyurethane rubber (Desmocol 500 ®, manufactured by Bayer AG, molecular weight: about 34,000) in methylene chloride (18.75 parts by weight, as the polyurethane rubber 1.0% by weight), and the mixture is uniformly mixed to give the main composition having a viscosity of 1,000 cps at 20° C.

PREPARATIONS 2 TO 8

Preparation of the main compositions (A):

In the same manner as described in Preparation 1, various water-soluble urethane prepolymers are prepared by using polyalkylene ether polyols and diisocyanates as shown in Table 1.

To the urethane prepolymer thus prepared (80 parts by weight) is added methylene chloride (20 parts by weight) and the mixture is uniformly mixed and, thereto is added a previously prepared 20% solution of polyurethane rubber (Desmocal 500 ®, manufactured by Bayer AG) (5 parts by weight, as polyurethane rubber 1.0% by weight) and the mixture is uniformly mixed to give main compositions as shown in Table 2.

TABLE 1

| Ingredients | | | Preparation No. (part by weight) | | | | | | |
|---|---|---|---|---|---|---|---|---|---|
| | M.W.[1] | E.O.[2] | 2 | 3 | 4 | 5 | 6 | 7 | 8 |
| Polyalkylene ether polyol: | | | | | | | | | |
| Adeka Polyol PR1003 ®* | 1,000 | 30% | — | — | 100 | — | — | — | — |
| Adeka Polyol PR2007 ®* | 2,000 | 70% | — | — | — | 200 | — | — | — |
| Adeka Polyol PR3007 ®* | 3,000 | 70% | 400 | 200 | — | — | 300 | — | — |
| Adeka Polyol PR5007 ®* | 5,000 | 70% | — | — | — | — | — | 300 | — |
| Sannix GEP2800 ®** | 2,800 | 30% | — | — | — | — | — | — | 200 |
| Diisocyanate: | | | | | | | | | |
| Diphenylmethane-4,4'-diisocyanate | | | 100 | — | 100 | 100 | 100 | 100 | 100 |
| Crude diphenylmethane-4,4'-diisocyanate | | | — | 100 | — | — | — | — | — |
| Urethane prepolymer | | | | | | | | | |
| NCO/OH ratio (molar equivalent) | | | 3.0 | 5.5 | 4.0 | 4.0 | 4.0 | 6.0 | 4.0 |
| Residual active isocyanate (%) | | | 4.5 | 8.5 | 12.6 | 12.6 | 6.3 | 7.1 | 8.4 |
| Viscosity (cps) | | | 10000 | 5000 | 8000 | 5000 | 7000 | 4000 | 8000 |

[Remarks]:
[1]Molecular weight,
[2]Ethylene oxide content
*Manufactured by Asahi Denka Kogyo K.K.
**Manufactured by Sanyo Kasei Kogyo K.K.

TABLE 2

| Ingredients | Preparation No. | | | | | | |
|---|---|---|---|---|---|---|---|
| | 2 | 3 | 4 | 5 | 6 | 7 | 8 |
| Urethane prepolymer (part by weight) | 80 | 80 | 80 | 80 | 80 | 80 | 80 |
| Methylene chloride (part by weight) | 20 | 20 | 20 | 20 | 20 | 20 | 20 |
| Desmocol 500 ®, 20% solution in methylene chloride (part by weight) | 5 | 5 | 5 | 5 | 5 | 5 | 5 |
| Viscosity of the main composition (cps at 20° C.) | 2000 | 1000 | 1500 | 1000 | 1400 | 800 | 1500 |

PREPARATIONS 9 TO 11

To a urethane prepolymer (300 parts by weight) as prepared in the same manner as described in Preparation 1 is added methylene chloride (25 parts by weight), and the mixture is uniformly mixed, and thereto is added a previously prepared 20% solution of a polyurethane rubber (Desmocol 500 ®, manufactured by Bayer AG) in methylene chloride (37.5 parts by weight, 56.25 parts by weight, or 187.5 parts, as polyurethane rubber 2%, 3%, or 10% by weight, respectively), and the mixture is uniformly mixed to give the main compositions as shown in Table 3.

PREPARATIONS 12 TO 19

To a urethane prepolymer (300 parts by weight) as prepared in Preparations 2 to 8 is added methylene chloride (25 parts by weight) and the mixture is uniformly mixed, and thereto is added a previously prepared 20% solution of a polyurethane rubber (Desmocol 530 ®, manufactured by Bayer AG, molecular weight: about 34,000) (18.75 parts by weight, as polyurethane rubber 1.0% by weight), and the mixture is uniformly mixed to give the main compositions as shown in Table 3.

TABLE 3

| Preparation Nos. | Urethane prepolymer | | Polyurethane rubber | | Viscosity of the main compositions (cps at 20° C.) |
|---|---|---|---|---|---|
| | Prepn. Nos. | Amount (part by weight) | Kind | Amount (part by weight) | |
| 9 | 1 | 300 | Desmocol 500 | 37.5 | 2,000 |
| 10 | 1 | " | Desmocol 500 | 56.25 | 3,500 |
| 11 | 1 | " | Desmocol 500 | 187.5 | 8,000 |
| 12 | 1 | " | Desmocol 530 | 18.75 | 1,500 |
| 13 | 2 | " | Desmocol 530 | " | 3,000 |
| 14 | 3 | " | Desmocol 530 | " | 1,500 |
| 15 | 4 | " | Desmocol 530 | " | 2,000 |
| 16 | 5 | " | Desmocol 530 | " | 1,500 |
| 17 | 6 | " | Desmocol 530 | " | 2,000 |
| 18 | 7 | " | Desmocol 530 | " | 1,200 |
| 19 | 8 | " | Desmocol 530 | " | 2,000 |

PREPARATION 20

Preparation of a curing composition (B):

Urea (10 parts by weight) is dissolved in water (90 parts by weight) to give a curing composition.

PREPARATIONS 21 TO 24

Various catalysts as shown in Table 5 are each dissolved in water in an amount as shown in Table 4 to prepare various curing compositions.

TABLE 4

| Ingredients | Preparation Nos. | | | |
|---|---|---|---|---|
| | 21 | 22 | 23 | 24 |
| Water (part by weight) | 93 | 95 | 96 | 95 |
| L-arginine (part by weight) | 7 | — | — | — |
| Triethylamine (part by weight) | — | 5 | — | — |
| Borax (part by weight) | — | — | 4 | — |
| Sodium hydroxide (part by weight) | — | — | — | 5 |

EXAMPLE 1

The main composition (A) as prepared in Preparation 1 and the curing composition as prepared in Preparation 20 are simultaneously sprayed onto a urethane foam for an automobile seat produced by an injection molding in an amount of 70 g/m$^2$ and 35 g/m$^2$, respectively. The urethane foam applied with the compositions is piled with a sheet of a polyester woven fabric, and the piled materials are pressed at 80° C. for 15 seconds to give a laminated product.

The laminated product was subjected to peel test. As a result, the product had a peel strength of 1.0 kg/in. Besides, it showed material break 10 seconds after the hot pressing.

REFERENCE EXAMPLE 1

In the same manner as described in Example 1 except that the water-soluble urethane prepolymer is used instead of the main composition (A), there is produced a laminated product.

This laminated product was subjected to peel test. In case of the hot pressing for 60 seconds, it showed a peel strength of 0.5 kg/in, and in case of the hot pressing for 90 seconds, it was still broken at interface.

EXAMPLE 2 TO 23

The same urethane foam used in Example 1 is applied with the main compositions as prepared in Preparation Nos. 1 to 19 and the curing compositions as prepared in Preparation Nos. 20 to 24 in an amount of 70 g/m$^2$ and 35 g/m$^2$, respectively in the same manner as described in Example 1. The urethane foam is piled up with a sheet of a polyester woven fabric, and then the pile product is subjected to hot pressing likewise.

The laminated products thus prepared were subjected to peel test. The results are shown in Table 5.

TABLE 5

| Ex. No. | Prepn. No. of main composition | Prepn. No. of curing composition | Time of hot pressing until the laminated product showing material break in peel test |
|---|---|---|---|
| 2 | 2 | 20 | 20 seconds |
| 3 | 3 | " | 15 seconds |
| 4 | 4 | " | 25 seconds |
| 5 | 5 | " | 25 seconds |
| 6 | 6 | " | 20 seconds |
| 7 | 7 | " | 20 seconds |
| 8 | 8 | " | 20 seconds |
| 9 | 9 | " | 15 seconds |
| 10 | 10 | " | 15 seconds |
| 11 | 11 | " | 12 seconds |
| 12 | 12 | " | 15 seconds |
| 13 | 13 | " | 20 seconds |
| 14 | 14 | " | 15 seconds |
| 15 | 15 | " | 25 seconds |
| 16 | 16 | " | 25 seconds |
| 17 | 17 | " | 20 seconds |
| 18 | 18 | " | 20 seconds |
| 19 | 19 | " | 20 seconds |
| 20 | 1 | 21 | 12 seconds |
| 21 | 1 | 22 | 12 seconds |
| 22 | 1 | 23 | 12 seconds |
| 23 | 1 | 24 | 12 seconds |

TEST 1

In order to study the effect of incorporation of the polyurethane rubber, laminated products were prepared in the same manner as described in Example 1 except that the amount of the polyurethane rubber (Desmocol 500) in the main composition was varied, and the time necessary for hot pressing where the resulting laminated product showed material break by the peel test was measured. The results are shown in Table 6.

TABLE 6

| Amount of polyurethane rubber (% by weight) | 0 | 1 | 2 | 3 | 10* |
|---|---|---|---|---|---|
| Time necessary for hot pressing (second) | 30 | 15 | 15 | 15 | 12 |

*Since the main composition had too high viscosity, the main composition could not be applied to by spraying, and the composition and the curing composition were mixed with a static mixer and then applied to by coating with a brush.

TEST 2

Laminated products were prepared in the same manner as described in Example 1 except that the pressing was carried at 80° C. and 20° C., and the materials to be adhered were canvas/canvas. The laminated products were subjected to the peel test, and the peel strength (kg/in) was measured (in all products, the state of break was cohesive failure). The results are shown in Table 7.

TABLE 7

| Amount of polyurethane rubber (% by weight) | 0 | 1 | 2 | 3 | 10* |
|---|---|---|---|---|---|
| Pressing at 80° C. | 2.0 | 4.0 | 4.5 | 4.0 | 2.5 |
| Pressing at 20° C. | 5.0 | 10.0 | 12.0 | 11.0 | 8.0 |

*The same as in Table 6.

As in clear from the above test results, when the polyurethane rubber is incorporated into the main composition, the initial adhesion is improved and hence the desired laminated product can be produced by hot pressing in a shorter period of time. Besides, when the polyurethane rubber is used in a larger amount, the main composition is hardly applied to by spraying.

What is claimed is:

1. A method for the production of a laminated product of porous materials, which comprises spraying simultaneously a two-part aqueous adhesive comprising
   (a) a main composition comprising a water-soluble urethane prepolymer and a polyurethane rubber, said polyurethane rubber being in an amount of 0.5 to 5% by weight based on the whole weight of the main composition, and (b) a curing composition comprising water and optionally a curing agent selected from the group consisting of urea and thiourea in an amount of 1 to 40% by weight based on the whole weight of the curing composition, to the surface of at least one of the materials to be adhered, wherein at least one of the materials to be adhered is a porous material, and piling up the materials and then pressing.

2. The method according to claim 1, wherein the urethane prepolymer is a reaction product of a polyalkylene ether polyol having an ethylene oxide content of 30 to 90% by mole and a molecular weight of 1,000 to 20,000 with a polyisocyanate selected from the group consisting of toluene diisocyanate and diphenylmethane-4,4'-diisocyanate in a ratio of NCO/OH of 3.0 to 6.0 equivalents.

3. The method according to claim 2, wherein the urethane prepolymer has a residual active isocyanate content of 4 to 13% by mole and a viscosity of 3,000 to 10,000 cps at 20° C.

4. The method according to claim 1, wherein the polyurethane rubber has a viscosity of 0.6 to 1.2 Pa.s at 23° C. in 15% methyl ethyl ketone solution, a 100% modulus of 50 to 80 kg/cm$^2$ and a molecular weight of 30,000 to 40,000.

5. The method according to claim 1, wherein the main composition (A) and the curing composition (B) are used in a ratio of 100:10 to 100:200 by weight.

* * * * *